United States Patent
Hall, Jr. et al.

(10) Patent No.: US 10,457,184 B2
(45) Date of Patent: Oct. 29, 2019

(54) CART ASSEMBLY FOR USE WITH A WORK PIECE AND METHODS OF USE

(71) Applicant: The Boeing Company, Chicago, IL (US)

(72) Inventors: Curtis L. Hall, Jr., Ladson, SC (US); Jeffrey Lee Sherman, Ladson, SC (US); Jeremy Potthast, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 170 days.

(21) Appl. No.: 15/671,825

(22) Filed: Aug. 8, 2017

(65) Prior Publication Data

US 2019/0047458 A1 Feb. 14, 2019

(51) Int. Cl.
  *B60P 1/02* (2006.01)
  *B66F 7/06* (2006.01)
  *B60P 1/04* (2006.01)

(52) U.S. Cl.
  CPC ........ *B60P 1/02* (2013.01); *B60P 1/04* (2013.01); *B66F 7/0683* (2013.01)

(58) Field of Classification Search
  CPC .............................. B60P 1/34; B66F 7/0683
  USPC ........ 414/332, 346, 347, 350, 590, 806, 816
  See application file for complete search history.

(56) References Cited

U.S. PATENT DOCUMENTS

| | | | | |
|---|---|---|---|---|
| 2,335,692 A | * | 11/1943 | Murray | B64F 5/50 108/9 |
| 3,811,579 A | * | 5/1974 | Black | B65G 67/02 414/347 |
| 2007/0126196 A1 | * | 6/2007 | Klahn | B60D 1/155 280/86.5 |
| 2014/0027693 A1 | | 1/2014 | Hallman | |
| 2017/0050830 A1 | | 2/2017 | Podnar | |
| 2017/0313230 A1 | * | 11/2017 | Valtanen | B60W 30/04 |

FOREIGN PATENT DOCUMENTS

| | | |
|---|---|---|
| FR | 2685911 A1 | 7/1993 |
| WO | 9529865 A1 | 11/1995 |
| WO | 2006133700 A1 | 12/2006 |

* cited by examiner

*Primary Examiner* — Ronald P Jarrett
(74) *Attorney, Agent, or Firm* — Coats & Bennett, PLLC

(57) ABSTRACT

A cart assemblies and methods of use for supporting and positioning a work piece during manufacturing. The cart assembly includes a table with a work surface configured to support the work piece. The table is connected to a base that is configured to move the table along a work floor. A lift mechanism adjusts the elevation of the table above the work floor, and a tilt mechanism adjusts an angle of the table relative to the work floor. The lift and tilt mechanisms may be used separately or simultaneously to adjust the position of the table as needed. The cart assembly also includes a trolley. The trolley is configured to receive and support the work piece away from the base. This provides for access to additional sections of the work piece during assembly.

20 Claims, 7 Drawing Sheets

CART ASSEMBLY FOR USE WITH A WORK PIECE AND METHODS OF USE

TECHNOLOGICAL FIELD

The present disclosure relates generally to the field an assembly for moving and manipulating a work piece during a manufacturing process. More specifically, the present disclosure is directed to methods and apparatuses for transporting a work piece along an assembly line, and for adjusting vertical and angular orientations of the work piece to provide access to different sections of the work piece during assembly.

BACKGROUND

The manufacturing process for many items includes assembly along an assembly line. An assembly line is used for a wide variety of items, including but not limited to aircraft, automobiles, household appliances, and electronic goods.

The assembly line features a series of work stations that are each configured to perform one or more steps of the overall assembly process. The work stations are equipped with tools for adding components to the work piece. At the beginning of the assembly line, the work piece may start as a single component or the basic framework of the item. As the work piece progresses along the assembly line, the work piece is further assembled and begins to resemble the final item. By the end of the assembly line, the work piece is either complete or ready for additional manufacturing steps at a different assembly process. By way of example, a household appliance may be complete and ready for shipment to a customer at the end of the assembly line. Conversely, a component of an aircraft, such as an interior component, may be completed at the end of the assembly line and then moved for subsequent assembly into the larger overall aircraft.

It is often necessary to move and position the work piece at a variety of different physical positions at the different work stations. This is necessary to assemble the components on the various sections of the work piece. The positioning includes elevating the work piece to various heights above the work floor and/or orienting the work piece at different angular positions relative to the work floor. This may also include accessing the different sections and sides of the work piece (e.g., front-and-back, top-and-bottom, left-and-right sides).

The size and/or weight of the work piece often makes it difficult or impossible for a worker to physically lift and manipulate the work piece. This is particularly true in later work stations along the assembly line when the numerous components have already been added to the work piece and it begins to resemble its final configuration. Further, the worker is not able to handle the work piece because they are also handling tools and components needed for assembly.

SUMMARY

Aspects of the present disclosure comprise cart assemblies configured to support and position a work piece during an assembly process. The cart assemblies are configured to position the work piece at different elevational heights and angular orientations relative to a work floor. Methods of receiving and positioning the work pieces with a cart assembly are also disclosed.

An aspect of the present disclosure is directed to a cart assembly configured to move a work piece about a work floor. The cart assembly includes a base with a top side and a bottom side spaced from the top side. The bottom side configured to be supported on the work floor. A table is positioned on the top side of the base and includes a first end, a second end spaced from the first end, a pivot disposed towards the first end, and a work surface that extends between the first and second ends and configured to support the work piece. The table is pivotally mounted to move about the pivot between a horizontal position and a vertical position. A tilt mechanism is coupled to the table and configured to rotate the table about the pivot between the horizontal position and the vertical position. A lift mechanism is disposed between the base and the table and is configured to move the table relative to the base between a lowered position defining a first distance above the work floor and a raised position defining a second distance above the work floor that is greater than the first distance. A trolley that includes wheels is configured to be supported on the work floor. The trolley is connected to the base and horizontally movable relative to the base along the work floor between a retracted position and an extended position. In the retracted position, the trolley is vertically overlapped by the first end of the table and in the extended position the trolley is horizontally spaced away from the first end of the table.

In another aspect, the cart assembly includes at least one slide that connects the trolley to the base. The at least one slide is configured to prevent the trolley from rotating relative to the base.

In another aspect, the trolley is detachable from the at least one slide to remove the trolley from the base.

In another aspect, the trolley also includes a carousel operatively connected to the wheels and configured to rotate relative to the wheels of the trolley.

In another aspect, the trolley includes a pin that extends outward from the carousel and is sized to engage with the work piece.

In another aspect, the table is parallel to the base when in the horizontal position and perpendicular to the base when in the vertical position.

In another aspect, the cart assembly includes a processing circuit communicatively connected to the lift mechanism and the tilt mechanism, a drive train to drive the base along the work floor, and a wireless transceiver operatively connected to the processing circuit and configured to wirelessly communicate with a remote source to remotely control the drive train, the tilt mechanism, and the lift mechanism.

In another aspect, the cart assembly also includes a sensing circuit operatively connected to the processing circuit with the sensing circuit configured to detect an object within a physical envelope around the cart assembly and to signal the processing circuit to prevent movement of the cart assembly when the object is detected.

A further aspect is directed to a cart assembly configured to move a work piece about a work floor. The cart assembly includes a base with a top side and a bottom side spaced from the top side with the bottom side configured to be supported on the work floor. A table is positioned on the top side of the base and has a pivot and presents a work surface configured to support the work piece. A lift mechanism is disposed between the base and the table and is configured to move the table relative to the base between a lowered position and a raised position. A tilt mechanism is connected to the table and configured to rotate the table about the pivot between a horizontal position and a vertical position. A trolley is configured to be supported on the work floor. The trolley is connected to the base and horizontally movable along the work floor relative to the base between a retracted position and an extended position. The cart assembly is movable between first, second, third, fourth, and fifth positions. In the first position the table is in the lowered and horizontal positions and the trolley is in the retracted position. In the second position the table is in the raised and horizontal positions and the trolley is in the retracted position. In the third position the table is in the raised and vertical positions and the trolley is in the retracted position. In the fourth position the table is in the lowered and vertical positions and the trolley is in the retracted position. In the fifth position the table is in the vertical position and the trolley is in the extended position.

In a further aspect, the lift mechanism includes a scissor lift with first and second arms with each of the arms having a first end connected to the base and a second end connected to the table.

In a further aspect, the cart assembly includes an adapter plate configured to be attached to the work piece to secure the work piece to the trolley.

In a further aspect, the cart assembly includes at least one slide that connects the trolley to the base with the at least one slide configured to prevent the trolley from rotating relative to the base and to locate the trolley between the extended and retracted positions.

In a further aspect, the trolley includes wheels to move along the work floor and also a carousel mounted to the wheels and that rotates relative to the wheels.

In a further aspect, the cart assembly includes a processing circuit communicatively connected to the lift mechanism and the tilt mechanism, a drive train to drive the base along the work floor, and a wireless transceiver operatively connected to the processing circuit and configured to wirelessly communicate with a remote source to remotely control the lift mechanism and the tilt mechanism to move the cart assembly between the first, second, third, fourth, and fifth positions.

A further aspect is directed to a method of using a cart assembly to move a work piece about a work floor. The method includes: supporting the work piece with a table with the table attached to a base that is positioned on the work floor; positioning the table and the work piece in a lowered position a first distance from the work floor and with the table and the work piece in a horizontal position; raising the table away from the work floor to a raised position while the work piece is supported on the table and the base is on the work floor and the work piece is in the horizontal position; rotating the table and positioning the work piece transverse to the work floor while the work piece is supported on the table and the base is on the work floor and the table is in the raised position; positioning the work piece vertically over a trolley that is on the work floor and that is attached to base; lowering the table towards the work floor and positioning the work piece onto the trolley while the trolley is on the floor and is attached to the base while the work piece is supported on the table and the base is on the work floor; supporting the work piece on the trolley and removing the work piece from the table; and moving the trolley along the work floor away from the base while the trolley is supporting the work piece.

In a further aspect, the method includes supporting the work piece on a shelf of an elbow member that is attached to and that extends outward from the table while the table is in the vertical position.

In a further aspect, the method includes simultaneously moving the base along the work floor while rotating and raising the table.

In a further aspect, the method includes comprising remotely rotating and raising the table.

In a further aspect, the method includes rotating the table 90° between the horizontal position and a vertical position.

In a further aspect, the method includes detaching the trolley from the base while the trolley is supporting the work piece.

BRIEF DESCRIPTION OF THE DRAWINGS

Figure 1:
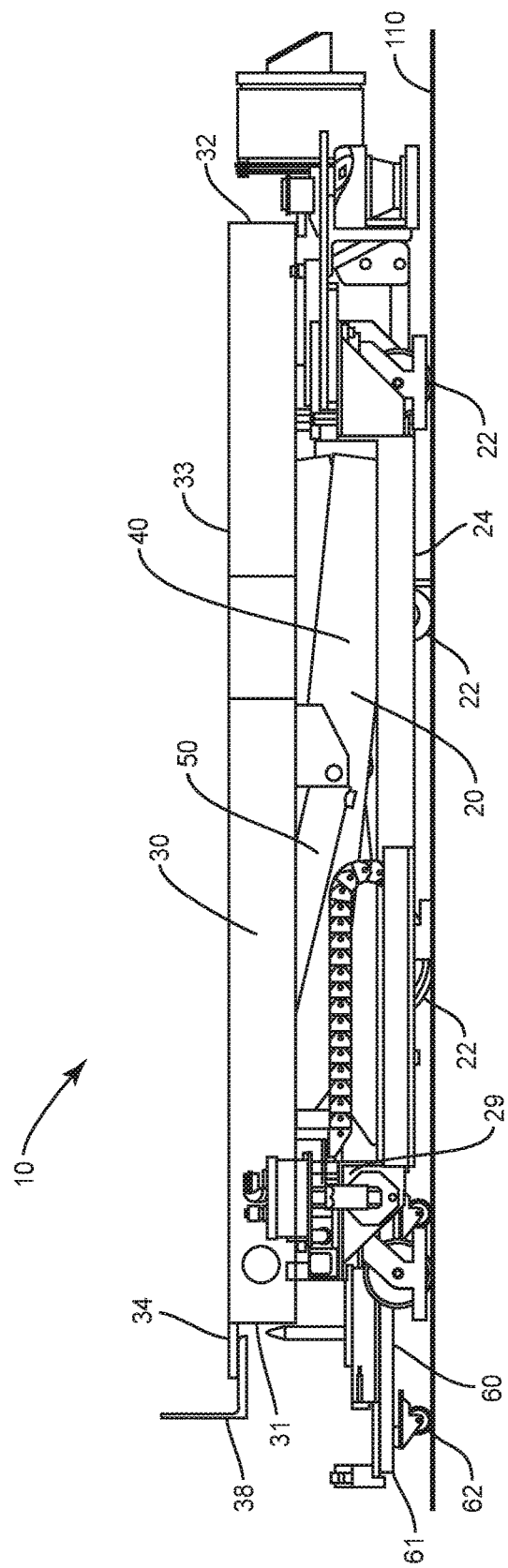

Having thus described variations of the disclosure in general terms, reference will now be made to the accompanying drawings, which are not necessarily drawn to scale, and wherein:

FIG. 1 is a side view of a cart assembly with a table in lowered and horizontal positions.

Figure 2:
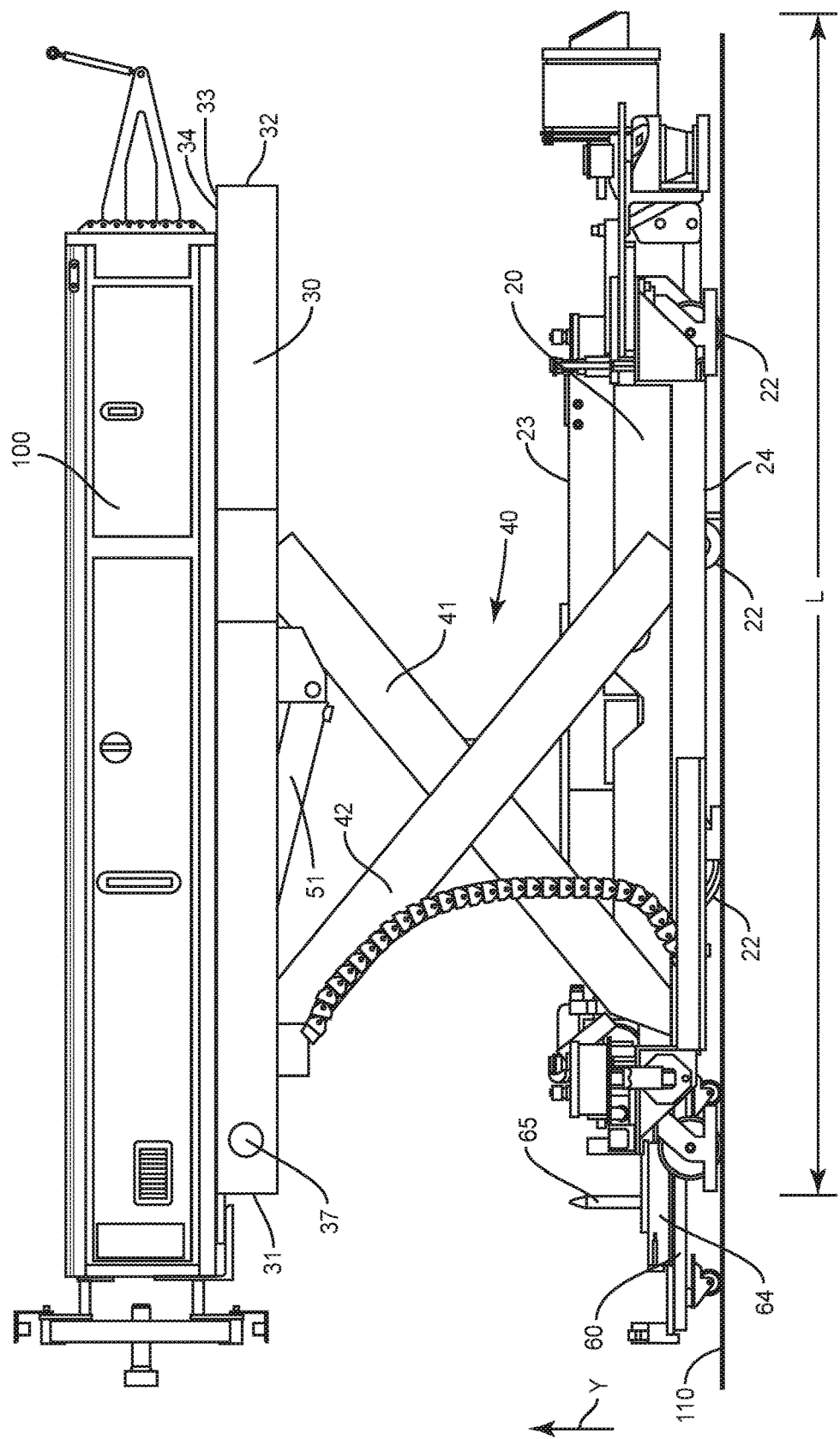

FIG. 2 is a side view of a cart assembly with a table in raised and horizontal positions.

Figure 3:
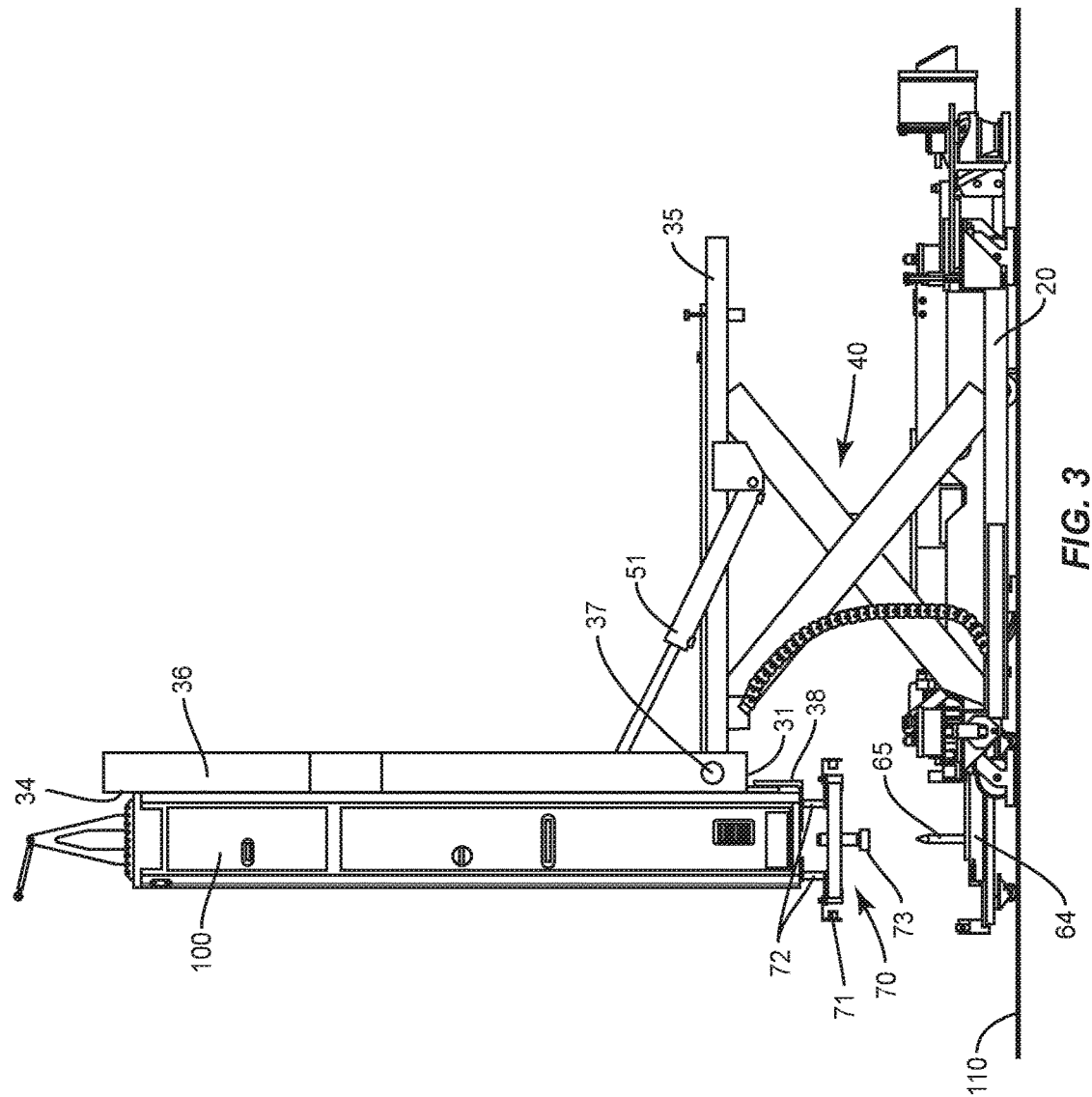

FIG. 3 is a side view of a cart assembly with a table in raised and vertical positions.

Figure 4:
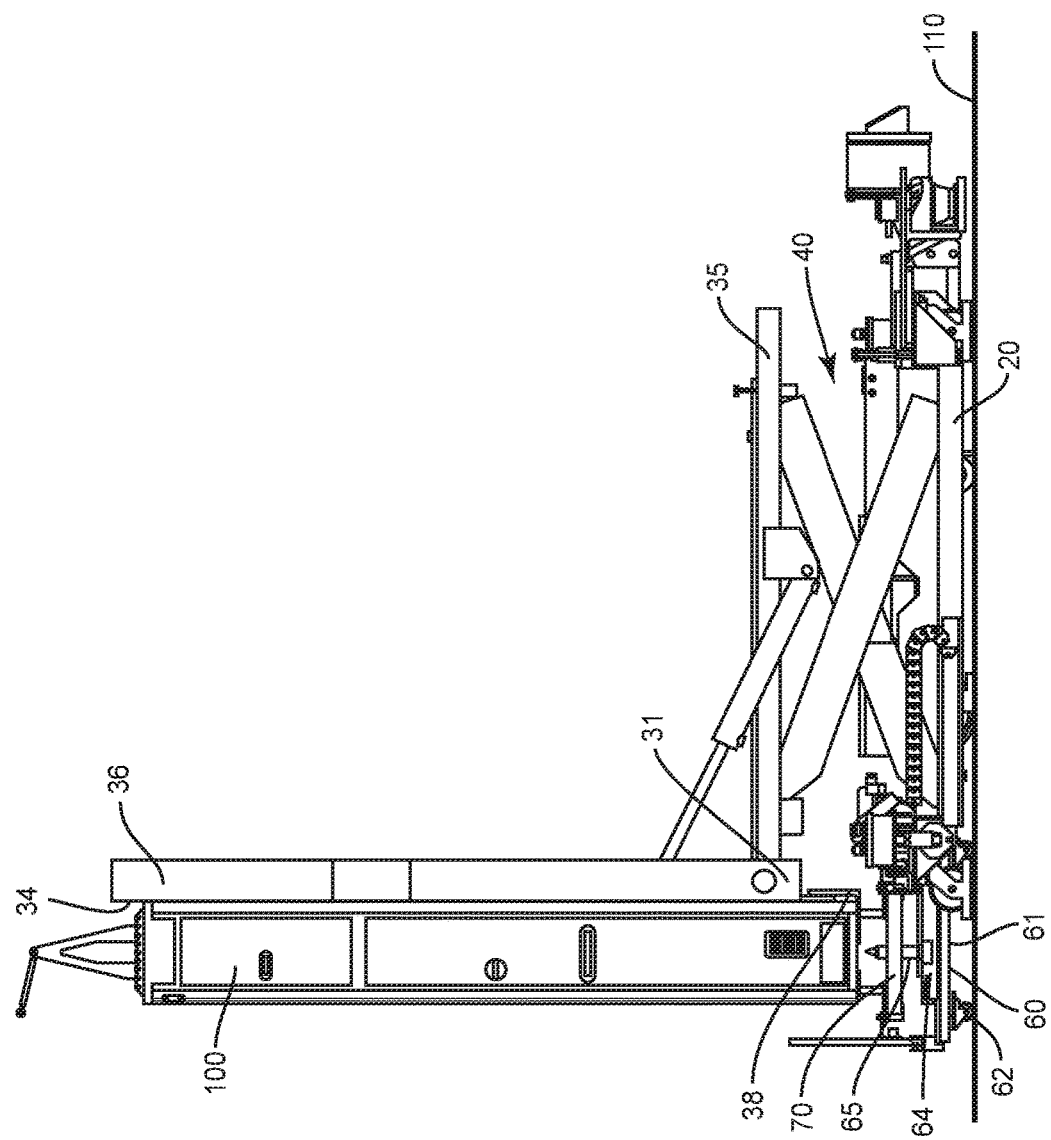

FIG. 4 is a side view of a cart assembly with a table in lowered and vertical positions and a work piece aligned vertically over a trolley.

Figure 5:
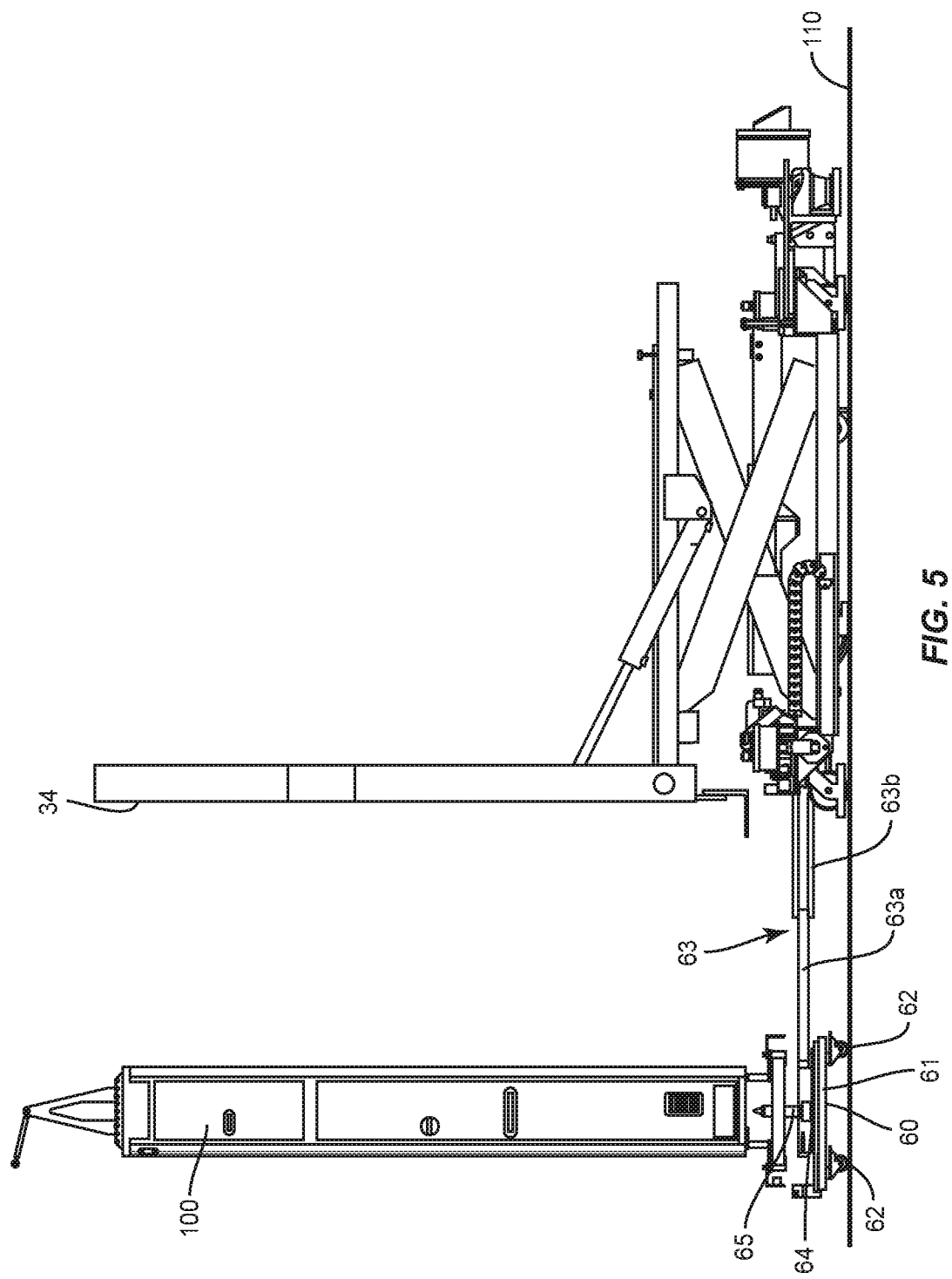

FIG. 5 is a side view of a cart assembly with a trolley in an extended position and a work piece supported on the trolley.

Figure 6:
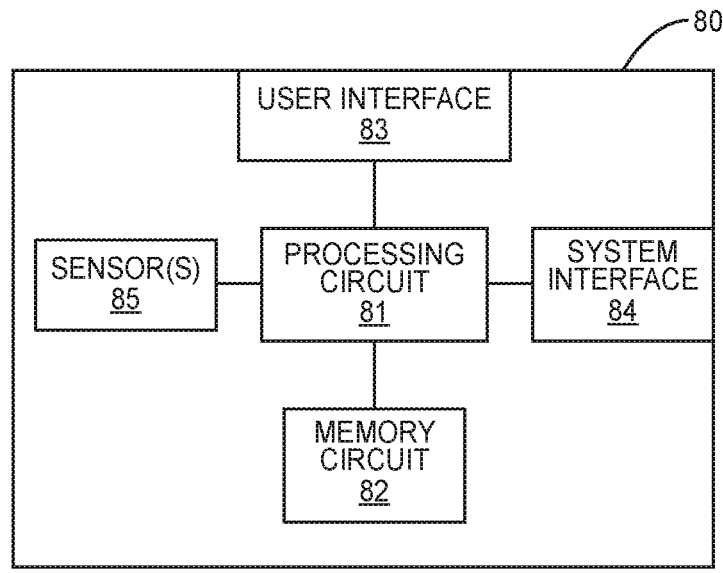

FIG. 6 is a schematic diagram of a control unit for a cart assembly.

Figure 7:
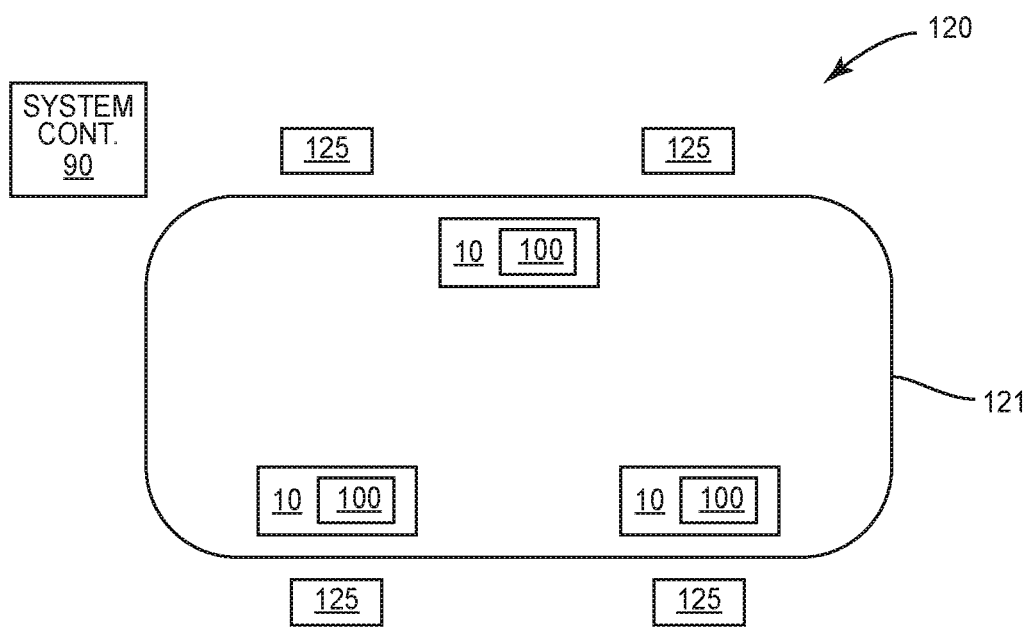

FIG. 7 is a schematic view of an assembly line with cart assemblies movable past work stations.

Figure 8:
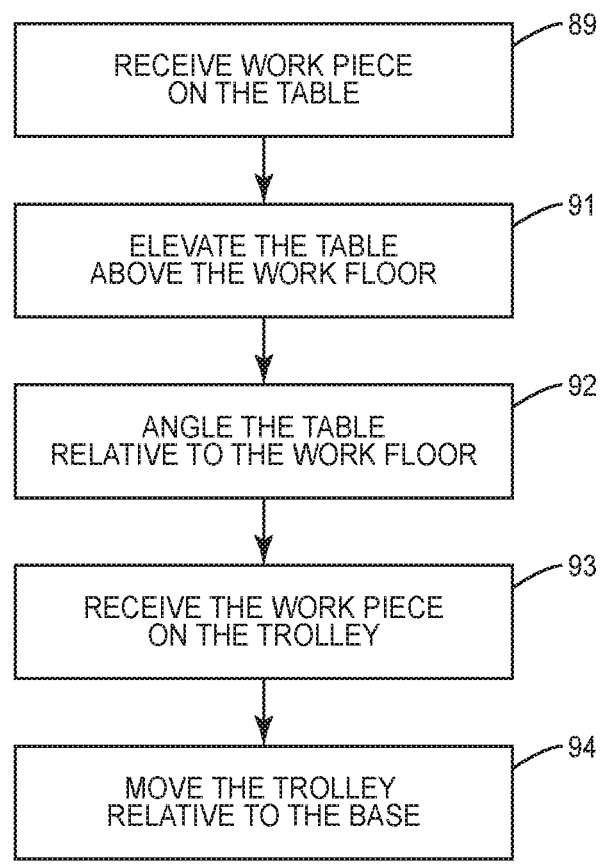

FIG. 8 is a flowchart diagram of a method of using a cart assembly with a work piece.

DETAILED DESCRIPTION

The present disclosure is directed to a cart assembly for positioning a work piece during manufacturing. The cart assembly includes a table with a work surface configured to support the work piece. The table is connected to a base that is movable along a work floor, and a lift mechanism that elevates the table above the work floor. A tilt mechanism provides for adjusting an angle of the table relative to the work floor. The lift and tilt mechanisms may be used separately or simultaneously to adjust the positioning of the table as needed. The cart assembly also includes a trolley. The trolley is configured to receive and support the work piece away from the base. This provides for a worker to access additional sections of the work piece during assembly.

FIG. 1 illustrates a cart assembly 10 that is positioned on a work floor 110. The cart assembly 10 includes a base 20 and a table 30. Lift and tilt mechanisms 40, 50 are configured to adjust the elevation and angular positions of the table 30 relative to the work floor 110. A trolley 60 is connected to the base 20 and movable relative to the base 20 along the work floor 110. A work piece (not illustrated in FIG. 1) may be moved from the table to the trolley 60. The trolley 60 may then be moved away from the base 20 to position the work piece 100 at additional positions to provide further accessibility for a worker.

The base 20 forms the foundation of the cart assembly 10. As illustrated in FIGS. 1 and 2, the base 20 includes an elongated length L with a top side 23 and a bottom side 24. Wheels 22 extend from the bottom side 24 to contact the work floor 110 and provide for movement of the cart assembly 10 along the work floor 110. The wheels 22 are configured to provide for movement in various directions about the work floor. The base 20 may also include a motor 29 and drivetrain that deliver power to one or more of the wheels 22 for propelling the cart assembly 10 around the work floor 110. In one design, the motor 29 is an electric motor, with other designs including other sources of power. In another design, the cart assembly 10 does not include a motor and drivetrain and relies upon the one or more workers for movement along the work floor 110.

The table 30 is positioned at the top side 23 of the base 20. The table 30 includes an elongated shape that extends between a first end 31 and a second end 32. A top side 33 of the table includes a work surface 34 configured to support a work piece 100. The work surface 34 may extend outward beyond one or both sides 31, 32, or may be located within the sides 31, 32. In one design, the work surface 34 is substantially flat such that the work piece 100 can be supported across the length. The work surface 34 may also include indents, extensions, etc. to conform to the shape of the work piece 100 that is to be supported. The work surface 34 may also include a textured surface, padding, or other like elements to prevent the work piece 100 from sliding off. A shelf 38 is connected to the table 30 and extends outward beyond the work surface 34. One design includes the shelf 38 being L-shaped with first and second legs. The first leg is connected to the work surface 34, and the second leg extends outward above the work surface 34. The shelf 38 may be positioned outward beyond the end 31, or may be positioned at a point along the work surface 34. The shelf 38 supports the work piece 100 when the table 30 is pivoted by the tilt mechanism 50.

The table 30 may also equipped to secure the work piece 100 to the work surface 34. One design features one or more straps that are connected to the table 30 and are sized to extend outward over the work piece 100. The table 30 may also include one or more receptacles configured to receive an end of a strap to attach the work piece 100 to the table 30. The receptacles may include openings or indents sized and configured to receive a hook at one or both ends of the straps. The table 30 may also include one or more openings through which a strap can be inserted. One design includes the straps having hook-and-loop members that engage together to secure the work piece 100. Other designs feature buckles, loops, or other elements that provide for securing the straps.

A lift mechanism 40 is configured to adjust the vertical position of the table 30 relative to the base 20. The vertical elevation is in the direction indicated by arrow Y and provides for lifting the table 30 away from the work floor 110. In some designs, the lift mechanism 40 is configured to move the table 30 directly away from and towards the base 20 in a direction that is perpendicular to the work floor 110. Other designs move the table 30 relative to the base 20 at a variety of different angles that are not perpendicular to the work floor 110.

One design includes the lift mechanism 40 being a scissor-lift with first and second supports 41, 42. Each support 41, 42 includes a first end that is connected to the base 20 and a second end that is connected to the table 30. The supports 41, 42 are positioned in a criss-cross X-pattern arrangement. As illustrated in FIG. 2, this includes the first end of the first support 41 and second end of the second support 42 on a first side of the intersection, and the second end of the first support 41 and the first end of the second support 42 being on a second side of the intersection. The lift mechanism 40 includes a power source that may be powered in various manners including electrical, hydraulic, and pneumatic. One or more of the designs may include a mechanical lift structure with a leadscrew or rack and pinion system that are powered by the power source. One design features a handle that can be cranked by the worked to provide the force for powering the lift mechanism 40 and moving the table 30 between the various elevational positions.

The first and second supports 41, 42 may include a single layer of arms 41, 42 positioned between the base 20 and table 30 as illustrated in FIG. 2. Other designs may include the two or more layers of arms 41, 42 that are pivotally mounted together in an end-to-end arrangement.

FIG. 1 includes a single set of supports 41, 42 located along the length L of the base 20. Other designs may feature two or more sets of supports 41, 42 positioned along the length L. Further, multiple sets of supports 41, 42 may be positioned along the width (i.e., into the page as viewed in FIG. 2).

FIG. 1 illustrates the cart assembly 10 in a lowered position with the table 30 a first distance from the work floor 110. In the lowered position, the table 30 may be located above the base 20, or may overlap with the base 20. FIG. 2 illustrates a raised positioned with the table 30 elevated above the work floor 110 and away from the base 20. The cart assembly 10 may also be positioned at various elevations between the raised and lowered positions as necessary for the work piece 110 to be accessible to the worker.

The arms 41, 42 may include the same length to cause the table 30 to be maintained flat with the work surface 34 parallel to the work floor 110. The arms 41, 42 may also include different lengths such that the table 30 angles as it is lifted away from the work floor 110.

A tilt mechanism 50 is configured to pivot the table. As illustrated in FIG. 3, the table 30 includes a first section 35 and a second section 36. The first section 35 is attached to the lift mechanism 40 and the second section 36 includes the work surface 34 that supports the work piece 100. The first and second sections 35, 36 are connected together at a pivot 37 that is positioned towards the first end of the table 30 and provides for pivoting movement. In one design, the pivot 37 includes one or more pins that extend through each of the first and second sections 35, 36 and provide for the pivoting movement. Another design features an elongated bar that extends along the width of the sections 35, 36 and through openings in each that provides for the pivoting movement.

The tilt mechanism 50 includes one or more cylinders 51 that are connected to the underside of the second section 36 and to one or more of the first section 35 and/or lift mechanism 40. The one or more cylinders 51 are extendable in length and may be hydraulic, electrical, or pneumatic powered. The cylinders 51 are movable between a first orientation to position the table 30 at a level orientation as illustrated in FIGS. 1 and 2 and a second orientation to pivot the second section 36 relative to the first section 35 as illustrated in FIG. 3. In one design, the tilt mechanism 50 provides for selectively pivoting the table within a range between 0°-90°. The one or more cylinders 51 are configured to support the table 30 at the various angular positions within the range.

The tilt mechanism 50 and the lift mechanism 40 are configured to simultaneously position the table 30 at the various angular and elevational positions. Thus, a worker is able to lift and angle the table 30 as needed to position the work piece 100 in a desired orientation. By way of example, FIG. 2 illustrates the table 30 in raised and horizontal positions. The lift mechanism 40 and the tilt mechanism 50 may also be used individually, thus allowing a worker to independently adjust height and angle as necessary.

One or more of the lift and tilt mechanisms 40, 50 may include a servomechanism featuring a built-in encoder or other position feedback mechanism to track the elevational and/or angular position of the table 30.

In one design, the table 30 is parallel to the base 20 when in the horizontal position and perpendicular to the base 20 in the vertical position. In one design, the table 30 is parallel to the work floor 110 when in the horizontal position and perpendicular to the work floor 110 in the vertical position.

A trolley 60 is movably attached to the base 20 and configured to support the work piece 100 away from the base 20. As illustrated in FIGS. 4 and 5, the trolley 60 includes a base 61 with wheels 62 that extend outward to contact against the work floor 110. The base 61 may include various lengths and widths to provide a support structure to support the work piece 110. The wheels 62 may be positioned about the bottom of the base 61 to support the base 61 and provide for movement of the trolley 60 along the work floor 110. In one design, the trolley 60 is not powered, but rather is movable when pushed and pulled by a worker. Other designs include an engine and drivetrain with one or more of the wheels 62 being powered.

The trolley 60 is attached to the base 20 by one or more arms 63. The one or more arms 63 provide for the trolley 60 to move along the work floor 110 between a retracted position as illustrated in FIG. 4 in closer proximity to the base 20 and an extended position as illustrated in FIG. 5. One or more of the arms 63 may include first and second sections 63a, 63b as illustrated in FIG. 5. The first section 63a includes a straight shape and is sized to slide into a slot that extends along the second section 63b. In the retracted position, the sections 63a, 63b are in an overlapping, side-by-side arrangement. In the extended position, the sections 63a, 63b are in an extended, end-to-end arrangement. The ends of the sections 63a, 63b remain overlapped to maintain the connection between the trolley 60 and the base 20.

The one or more arms 63 may also be disconnected such that the trolley 60 can moved about the work floor 110 independently from the base 20. This may include when the work piece 110 is loaded onto the trolley 60. The arms 63 may remain attached to the base 20, to the trolley 60, or to each (i.e., first section 63a remains attached to the trolley 60 and second section 63b remains attached to the base 20). Disconnecting the arms 63 may include sliding the first arm sections 63a out of the ends of the second arm sections 63b. This may also include removing a mechanical fastener at one or both of the trolley 60 and base 20 that attaches the one or more arms 63. The trolley 60 can also be reattached to the base 20 by sliding the arm sections 63a, 63b together and/or reattaching the one or more mechanical fasteners.

The trolley 60 may be secured in the retracted position. One design includes a magnetic release in which the trolley 60 and base 20 include magnets that can be magnetically connected together to stow the trolley 60 in the retracted position. A worker may apply a force to the trolley 60 to overcome the magnetic force and move the trolley 60 to the extended position. A mechanical latch may also be provided on one or both of the trolley 60 and base 20 to secure the trolley 60 in the retracted position.

A carousel 64 is positioned on the top of the base 61. In one design, the carousel 64 is rotatable relative to the base 61, with other designs including the base 61 and table 64 being fixedly connected. One or more pins 65 extend upward from the table 64 to engage with the work piece 100 when the work piece 100 is positioned on the trolley 60. The pins 65 may include a variety of sizes and shapes, with designs including a length of 10 inches and a circular sectional shape.

As illustrated in FIG. 2, the pin 65 is located laterally outward from the pivot 37 on the table 30. This provides for the work piece 100 to be aligned vertically above the carousel when the table 30 is tilted to the vertical position (as illustrated in FIG. 3). Other designs include the trolley 60 recessed laterally inward of the pivot 37. The user adjusts the lateral position of the trolley 60 relative to the base 20 when aligning the work piece 100 prior to transfer to the trolley 60.

As further illustrated in FIGS. 3 and 4, the trolley 60 is vertically overlapped by the first end of the table 30. This positioning provides for the trolley 60 to receive and support the work piece 100 from the table 30. Once received, the trolley 60 is horizontally movable along the work floor 110 and is spaced away from the first end 31 of the table 30.

An adapter plate 70 may be attached to the work piece 100 to engage with the trolley 60 when the work piece 100 is transferred to the trolley 60. As illustrated in FIG. 3, the adapter plate 70 includes a plate 71 with one or more extensions 72 extending outward from a first side and an extension 73 extending from an opposing second side. The first extensions 72 are configured to conform to and engage with the work piece 100. The extensions 72 may include various shapes and sizes to provide for engagement with the work piece 100. Extension 73 may be hollow to form a receptacle 73 sized to receive the pin 65.

The trolley 60 is configured to support the work piece 100 away from the base 20. As illustrated in FIG. 4, the work piece 100 is lowered onto the trolley 60 while in a vertical position on the table 30. With the table 30 in this vertical position, the extension 73 of the adapter plate 70 aligns with the pin 65 of the carousel 64. The lift mechanism 40 can lower the table 30 causing the work piece 100 to move downward onto the trolley 60. The extension 73 is positioned on the pin 65 and brought into contact with the carousel 64.

Once the work piece 100 is on the trolley 60, the trolley 60 may be moved away from the base 20. This includes extending the one or more arms 63 and sliding the trolley 60 along the work floor 110. With the trolley 60 positioned away from the base 20, the work piece 100 may be rotated on the carousel 64. This may include rotating the extension 73 of the adapter plate around the pin 65. This rotation provides for additional access to the work piece 100 by the worker. Once completed, the trolley 60 may be moved back to the retracted position at the base 20. This includes sliding the one or more arms 63 together. The table 30 is positioned relative to the work piece 100 with the shelf 38 extending underneath the lower end of the work piece 100. The lift mechanism 40 may then elevate the table 30 and lift the work piece off the trolley 60. The lift and tilt mechanisms 40, 50 may then be used to locate the table 30 and work piece 100 as necessary.

The cart assembly 10 includes a control unit 80 that controls the operation. The control unit 80 may signal control steps to the lift mechanism 40, tilt mechanism 50, and motor 29. The control unit 80 is typically housed in the base 20, although it may be located in other components including but not limited to the table 30 and the trolley 60.

As illustrated in FIG. 6, the control unit 80 includes one or more processing circuits (shown as processing circuit 81) that may include one or more microprocessors, Application Specific Integrated Circuits (ASICs), or the like, configured with appropriate software and/or firmware. A computer readable storage medium (shown as memory circuit 82)

stores data and computer readable program code that configures the processing circuit 81 to implement the techniques described above. Memory circuit 82 is a non-transitory computer readable medium, and may include various memory devices such as random access memory, read-only memory, and flash memory.

A worker interface 83 includes one or more user input devices such as a keypad, touchpad, function keys, scroll wheel, or other type of computer input device. The interface 83 may include a display screen, such as a conventional liquid crystal display (LCD) or touch screen display which also functions as a user input device. The interface 83 provides for the worker to control the functions of the various components that are in communication with the control unit 80.

A system interface 84 is configured to communications with a remote source. In one design, this includes a system controller 90. This may also include a remote control source used by the worker who is remote from the cart assembly 10. The system interface 84 includes a transceiver configured to wirelessly communicate with the remote source. The system interface 84 may also provide for hardwire connection with the remote source. The system interface 84 may also provide for the supply of power from a remote source.

The control unit 80 may also include a power source 86. The power source 86 may be used in the event of failure of receiving power from the remote source. The power source 86 may also provide power to just one or more limited elements, such as the processing circuit 81 and the memory circuit 82. The power source may be rechargeable battery pack that includes a set of battery cells configured to power electrical equipment.

One or more sensors 85 may detect the presence of an object within a work envelope of the cart assembly. This may include within a specific distance of the base 20, such as a ten foot area. The sensors 85 detect a person or object within a predetermined distance of the cart assembly 10 and signals to stop operation of one or more components to prevent a potentially unsafe condition. The sensors 85 are configured to detect the object. Various sensor types may be used, including a camera, heat sensor, and movement sensor.

In some designs, the cart assembly 10 is a stand-alone device that operates independently. Other designs include the cart assembly 10 being a component within a larger work area system such as an assembly line 120 as illustrated in FIG. 7. The assembly line 120 includes one or more cart assemblies 10 that move around an assembly track 121. Work stations 125 are positioned around the track 121 and each is configured to perform one or more assembly steps on the work pieces 100.

Some or all functionality of the cart assemblies 10 may be controlled by a system controller 90. The system controller 90 communicates with the cart assemblies 10 and controls and oversees the operation of the assembly line 120. The system controller 90 may be housed in a cabinet or the like at some distance from the assembly line 120. The system controller 90 may include a control circuit with one or more microprocessors, microcontrollers, and ASICs that with appropriate software and/or firmware. A memory circuit stores data and computer readable program code that configures the control circuit to implement the techniques described above. Memory circuit is a non-transitory computer readable medium, and may include various memory devices such as random access memory, read-only memory, and flash memory. The system controller 90 may also include an interface to send and receive data to the cart assemblies 10.

Communications between the system controller 90 and cart assemblies 10 may occur through a cabling system with various cables extending between the elements. The cables are configured for carrying various data signals. In one design, the system communicates through a LAN, with another design featuring communication through a communications bus. The communication may also include a wireless interface, such as through a Bluetooth interface or wireless local area network (WLAN) interface. Some embodiments feature a combination of cabling and wireless communications. The cabling system may further be configured to provide power from a power source to the cart assemblies 10. Control information from each cart assembly 10, such as angle, elevational information, and drive train information, is signaled to the system controller 90. The system controller 90 is then able to monitor the assembly process and transmit control signals to the cart assemblies 10 as necessary to continue the process.

FIG. 8 illustrates one method of using the cart assembly 10 with a work piece 100. Initially, the work piece 100 is positioned on the work surface 34 of the table 30 (block 89). The table 30 may be at various heights above the work floor 110 and/or angular orientations relative to the work floor 110 when the work piece 100 is positioned on the work surface 34. This may include the table 30 being in a lowered positioned with the work surface 34 parallel to the work floor. After positioning on the table 30, the work piece 100 is secured onto the work surface 34. This may include positioning one or more straps over the work piece 100 and securing the straps to the table 30.

The table 30 is then elevated and angled at the desired orientation (blocks 91, 92). The lift mechanism 40 is activated to adjust the elevation and the tilt mechanism 50 is activated to adjust the angle. The elevation and angular movements may be performed sequentially, or may be performed simultaneously. Adjustments of the height and/or angle provide for the worker to access the various sections of the work piece 100 to perform the various assembly steps.

The work piece 100 may also be moved to the trolley 60 for additional assembly steps (block 93). Prior to moving the work piece 100 to the trolley 60, an assembly plate 70 may be attached to the work piece 100. This may include positioning one or more of the extensions 72 into receptacles in the work piece 100. Fasteners may be secured to the extensions 72 to secure the adapter plate 70 to the work piece 100. In another design, an adapter plate 70 is not used, but rather the work piece 100 is configured to engage with the trolley 60.

To move the work piece 100 to the trolley 60, the table 30 is positioned to be vertically above the trolley 60. In one design, this includes positioning the table 30 at a vertical position (i.e., perpendicular relative to the work floor 110). This positions a section of the work piece 100 directly over the trolley 60. This orientation of the table 30 may result in the work piece 110 being supported by the shelf 38 that extends outward from the work surface 34. The trolley 60 may be positioned in a retracted position to receive the work piece 100. In another design, the trolley 60 is in an extended position outward from the base 20.

Once the work piece 100 is aligned with the trolley 60, the table 30 is lowered such that the work piece 100 is moved onto and supported on the carousel 64. When an adapter plate 70 is used, this includes inserting the pin 65 on the trolley 60 into an opening in the adapter plate 70. Straps, fasteners, or other like mechanical connectors may further secure the work piece 100 to the trolley 60. Without an adapter plate, the work piece 100 may be simply positioned on the surface of the carousel 64 and secured by straps, fasteners, or some other mechanical connectors.

Once the work piece 100 is on the trolley 60, the trolley 60 may be moved away from the base 20 (block 94). This may include extending the trolley 60 outward from the base 20 along the arms 63. This may also include detaching the trolley 60 from the base 20. In the various designs, different portions of the work piece 100 are accessible for the user to perform additional assembly steps. For example, the side of the work piece 100 that was facing the table 30 is now accessible for the user. Further, the work piece 100 may be rotated on the trolley 60 to provide access as necessary. This includes the adapter plate 70 rotating around the pin 65 as the user applies a rotating force to the work piece 100. This may also include the carousel 64 rotating relative to the base 61 of the trolley 60.

The trolley 60 and the work piece 100 may remain detached from the base 20 as the remainder of the cart assembly 10 moves along the assembly line 120. Alternatively, the trolley 60 may be reattached to the base 20 and the cart assembly 10 and work piece 100 are moved along the assembly line 120.

When the trolley 60 is reattached, the table 30 may be positioned to re-engage with the work piece 100. This may include positioning the table 30 in the lowered and vertical positions, and laterally moving the shelf 38 on the work surface 34 underneath the lower edge of the work piece 100. The table 30 may then be raised with the work piece 100 being lifted off of the trolley 60 and onto the table 30. The work piece 100 may be angled as needed during or after the lifting process.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects including, without limitation, bridge trusses, support columns and structures, general construction objects, etc. Further structures and objects include vehicles, such as, without limitation, aircraft, satellites, rockets, missiles, etc., and therefore further include manned and unmanned aircraft, manned and unmanned spacecraft, manned and unmanned rotorcraft, manned and unmanned terrestrial vehicles, manned and unmanned non-terrestrial vehicles, manned and unmanned surface and sub-surface water-borne vehicles, objects, and structures. Particularly contemplated components include aircraft stringer, spars, ribs, as well as components comprising other planar and non-planar geometries used in the manufacture of aircraft components and parts, etc.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof. When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A cart assembly configured to move a work piece about a work floor, the cart assembly comprising:
    a base having a top side and a bottom side spaced from the top side, the bottom side configured to be supported on the work floor;
    a table positioned on the top side of the base and comprising a first end, a second end spaced from the first end, a pivot disposed towards the first end, and a work surface that extends between the first and second ends and configured to support the work piece, the table pivotally mounted to move about the pivot between a horizontal position and a vertical position;
    a tilt mechanism comprising an elongated arm that is coupled to the table and configured to rotate the table about the pivot between the horizontal position and the vertical position;
    a lift mechanism comprising an elongated body that is disposed between the base and the table, the lift mechanism configured to move the table relative to the base between a lowered position defining a first distance above the work floor and a raised position defining a second distance above the work floor that is greater than the first distance; and
    a trolley comprising wheels configured to be supported on the work floor, the trolley connected to the base and horizontally movable relative to the base along the work floor between a retracted position and an extended position;
    wherein in the retracted position, the trolley is vertically below and overlapped by the pivot that is disposed towards the first end of the table and in the extended position the trolley is horizontally spaced away from the pivot that is disposed towards the first end of the table.

2. The cart assembly of claim 1, further comprising at least one slide that connects the trolley to the base, the at least one slide configured to prevent the trolley from rotating relative to the base.

3. The cart assembly of claim 2, wherein the trolley is detachable from the at least one slide to remove the trolley from the base.

4. The cart assembly of claim 1, wherein the trolley further comprises a carousel operatively connected to the wheels and configured to rotate relative to the wheels.

5. The cart assembly of claim 4, wherein the trolley further comprises a pin that extends outward from the carousel, the pin sized to engage with the work piece.

6. The cart assembly of claim 1, wherein the table is parallel to the base when in the horizontal position and perpendicular to the base when in the vertical position.

7. The cart assembly of claim 1, further comprising a processing circuit communicatively connected to the lift mechanism and the tilt mechanism, and wherein the base is configured to be driven along the work floor and the cart assembly is configured to wirelessly communicate with a remote source to remotely control the tilt mechanism and the lift mechanism.

8. The cart assembly of claim 7, further comprising a sensing circuit operatively connected to the processing circuit, the sensing circuit configured to detect an object within a physical envelope around the cart assembly and to signal the processing circuit to prevent movement of the cart assembly when the object is detected.

9. A cart assembly configured to move a work piece about a work floor, the cart assembly comprising:
- a base with a top side and a bottom side spaced from the top side, the bottom side configured to be supported on the work floor;
- a table positioned on the top side of the base, the table having a pivot and presenting a work surface configured to support the work piece;
- a lift mechanism comprising an elongated body that is disposed between the base and the table, the lift mechanism configured to move the table relative to the base between a lowered position and a raised position;
- a tilt mechanism comprising an elongated arm that is connected to the table and configured to rotate the table about the pivot between a horizontal position and a vertical position; and
- a trolley configured to be supported on the work floor, the trolley connected to the base and horizontally movable along the work floor relative to the base between a retracted position and an extended position with the retracted position being vertically below the pivot;
- the cart assembly being movable between first, second, third, fourth, and fifth positions;
- in the first position the table is in the lowered and horizontal positions and the trolley is in the retracted position;
- in the second position the table is in the raised and horizontal positions and the trolley is in the retracted position;
- in the third position the table is in the raised and vertical positions and the trolley is in the retracted position;
- in the fourth position the table is in the lowered and vertical positions and the trolley is in the retracted position;
- in the fifth position the table is in the vertical position and the trolley is in the extended position.

10. The cart assembly of claim 9, wherein the elongated body of the lift mechanism comprises a scissor lift comprising first and second arms with each of the arms having a first end connected to the base and a second end connected to the table.

11. The cart assembly of claim 9, further comprising an adapter plate configured to be attached to the work piece to secure the work piece to the trolley.

12. The cart assembly of claim 9, further comprising at least one slide that connects the trolley to the base, the at least one slide configured to prevent the trolley from rotating relative to the base and to locate the trolley between the extended and retracted positions.

13. The cart assembly of claim 12, wherein the trolley comprises wheels to move along the work floor, the trolley also comprises a carousel mounted to the wheels and that rotates relative to the wheels.

14. The cart assembly of claim 9, further comprising a processing circuit communicatively connected to the lift mechanism and the tilt mechanism and wherein the base is configured to be driven along the work floor and the cart assembly is configured to wirelessly communicate with a remote source to remotely control the lift mechanism and the tilt mechanism to move the cart assembly between the first, second, third, fourth, and fifth positions.

15. A method of using a cart assembly to move a work piece about a work floor, the method comprising:
- supporting the work piece with a table, the table being attached to a base that is positioned on the work floor;
- positioning the table and the work piece in a lowered position a first distance from the work floor and with the table and the work piece in a horizontal position;
- raising the table away from the work floor to a raised position while the work piece is supported on the table and the base is on the work floor and the work piece is in the horizontal position;
- rotating the table about a pivot and positioning the work piece transverse to the work floor while the work piece is supported on the table and the base is on the work floor and the table is in the raised position;
- positioning the work piece and the pivot vertically over a trolley that is on the work floor and that is attached to base;
- lowering the table towards the work floor and positioning the work piece onto the trolley while the trolley is on the floor and is attached to the base while the work piece is supported on the table and the base is on the work floor and the pivot is vertically over the trolley;
- supporting the work piece on the trolley and removing the work piece from the table; and
- moving the trolley along the work floor away from the base while the trolley is supporting the work piece.

16. The method of claim 15, further comprising supporting the work piece on a shelf of an elbow member that is attached to and that extends outward from the table while the table is in the vertical position.

17. The method of claim 15, further comprising simultaneously moving the base along the work floor while rotating and raising the table.

18. The method of claim 15, further comprising remotely rotating and raising the table.

19. The method of claim 15, further comprising rotating the table 90° between the horizontal position and a vertical position.

20. The method of claim 15, further comprising detaching the trolley from the base while the trolley is supporting the work piece.

* * * * *